(12) United States Patent
Ganame et al.

(10) Patent No.: US 10,218,731 B2
(45) Date of Patent: Feb. 26, 2019

(54) METHOD AND SYSTEM FOR DATA BREACH AND MALWARE DETECTION

(71) Applicant: Efficient Protection Inc., Montreal, Quebec (CA)

(72) Inventors: Karim Ganame, Saint-Constant (CA); Ahmed Techini, Montreal (CA)

(73) Assignee: EFFICIENT PROTECTION INC., Montreal (CA)

( * ) Notice: Subject to any disclaimer, the term of this patent is extended or adjusted under 35 U.S.C. 154(b) by 168 days.

(21) Appl. No.: 15/286,120

(22) Filed: Oct. 5, 2016

(65) Prior Publication Data

US 2017/0099312 A1   Apr. 6, 2017

Related U.S. Application Data

(60) Provisional application No. 62/237,024, filed on Oct. 5, 2015.

(51) Int. Cl.
*H04L 29/06* (2006.01)
*G06N 99/00* (2019.01)

(52) U.S. Cl.
CPC ....... *H04L 63/1425* (2013.01); *G06N 99/005* (2013.01); *H04L 63/1441* (2013.01)

(58) Field of Classification Search
CPC ............. H04L 63/1416; H04L 63/1408; H04L 63/1441; H04L 63/1458; G06F 21/552
USPC .......................................................... 726/23
See application file for complete search history.

(56) References Cited

U.S. PATENT DOCUMENTS

| | | | |
|---|---|---|---|
| 2015/0101053 A1* | 4/2015 | Sipple ................. | H04L 63/1425 726/24 |
| 2016/0164886 A1* | 6/2016 | Thrash .................... | H04L 63/14 726/23 |

\* cited by examiner

*Primary Examiner* — Evans Desrosiers
(74) *Attorney, Agent, or Firm* — Robert Brouillette; Brouillette Legal Inc.

(57) ABSTRACT

Detecting cyber threat and malware, particularly zero-day malware is a major challenge for the security community. Signature-based methods of cyber threat and malware detection are unable to detect zero-day malware. In order to detect zero-day malware and cyber threat which may have more severe impacts, a system called Compromised Detection System (CDS) and a method thereof is disclosed. The CDS uses a sophisticated approach and method based on Machine Learning to detect anomalies on the network behavior. By such approach, CDS is able to detect unknown cyber threat and malware (aka zero day)since they will present a deviation from the normal behavior in the network.

20 Claims, 6 Drawing Sheets

METHOD AND SYSTEM FOR DATA BREACH AND MALWARE DETECTION

CROSS-REFERENCE TO RELATED APPLICATIONS

The present patent application claims the benefits of priority of U.S. Patent Application No. 62/237,024, entitled "Method and System for Data Breach and Malware Detection", and filed at the U.S. Patent Office on Oct. 5, 2015, the content of which is incorporated herein by reference.

FIELD OF THE INVENTION

The present invention generally relates to the field of computer networks, and more particularly to methods and systems for data breach and malware detection.

BACKGROUND OF THE INVENTION

Malware are widely used on cybercrime or cyber attacks to compromise devices and critical assets on computer networks. This can help malicious people to achieve many goals like stealing critical or sensitive data like credit card numbers, personal data, patent information, etc; and launch distributed denial of service (DDOS) attacks to slow other networks or make them unavailable.

The number of malicious binaries is alarmingly increasing. For instance, in 2013, 200,000 new suspicious malware binaries were identified each day and, in 2014, around 800,000 new suspicious malware binaries were identified each day.

The security community noticed that most of the new malware are variants of existing ones. It also appears that most of the malware are ephemeral (between 70% and 90% of malware appear only once, 82% of them remain active only 1 hour). Due to these facts, antivirus software, which are most of the time based on signature detection, decrease in efficiency because a new signature has to be created for each new variant of a malware, even if this new one is ephemeral. This is time consuming and not efficient. Signature-based malware detection is showing its limits and the security community has to find new approaches and methods to handle the large volume of malware with better detection rates.

In addition to the challenge of handling large volume of new malicious binaries, the security community has to fight with sophisticated malware or never seen before ones, also known as unknown or zero-day malware. Major security incidents that occurred in the past years has clearly shown that zero-day malware have the most severe impacts. Therefore, special attention should be paid to them. However, detecting them remains a big challenge for the security community.

The new system and method disclosed herein help fighting malware and particularly zero-days malware.

SUMMARY OF THE INVENTION

The invention, herein below named CDS for Compromise Detection System, is able to identify cyber threat and infected or compromised systems and devices on a network, by analyzing the network traffic without a direct interaction with the network devices. In addition to its signature based detection capability, the invention is mainly preferably focused on the detection of unknown and zero-day (0-day) cyber threat and malware, using a behaviour module based on machine learning algorithms and methods.

The invention is first directed to a system for detecting cyber threat, data breach, infected or compromised devices on a computer network, the system being connected to at least one segment of the computer network. The system comprises:

at least one data collection module for capturing network packets entering and/or going out of the computer network;

at least one network interface module comprising at least one network interface card through which the at least one data collection module listens for said network packets entering and/or going out of the computer network;

at least one analysis module for receiving the network packets from the at least one data collection module, said analysis module detecting traffic associated to cyber threat, malware, data breach, and/or malware related activities over the computer network;

at least one learning module comprising at least one machine learning algorithm, defining rules and training tasks for determining at least one behaviour of the computer network, allowing detection of at least one deviation from said behaviour of the computer network;

at least one knowledge database for storing data about said behaviour of the computer network and at least one signature element of a known malware, each knowledge database providing stored data to each learning module and analysis module;

at least one scoring module for correlating data from the at least one learning module for reducing false positives in at least one behaviour detection phase; and at least one alerting module for creating at least one alert upon detection by the analysis module of malware, data breach, and malware related activities over the computer network.

The invention is also directed to a method for detecting cyber threat, data breach, infected or compromised devices on a computer network. The method comprises the steps of:

a) collecting network packets entering and/or going out of the computer network from at least one segment of the computer network;

b) analyzing said network packets for detecting cyber threat, malware, data breach and malware related activities and feeding said network packets to at least one alerting module and to at least one learning module;

c) determining at least one behaviour of the computer network with at least one machine learning algorithm for allowing the detection of any deviation from said behaviour of the computer network;

d) storing data associated with the behaviour of the computer network and at least one signature of known malware, and feeding said associated data to at least one analysis module and at least one learning module;

e) correlating results obtained from steps b) and c) to reduce false positives in an at least one behaviour detection phase; and f) generating at least one alert or event upon detection of cyber threat, malware, data breach, and/or malware related activities over the computer network.

According to a preferred embodiment, it is disclosed a system for detecting cyber threat, data breach, infected or compromised devices on a computer network, the system comprising at least two modes of operation:

a) Standalone Mode

In the standalone mode, all the components of the modules are integrated in the same system.

b) Distributed Mode

In the distributed mode, a plurality of data collection modules are connected to each segment of a computer network and forward collected data to a centralized analysis module of the system.

The new system and method disclosed herein help fighting cyber threat, malware and particularly zero-days malware. The system is able to detect cyber threat and infected or compromised devices in a network by analyzing the network traffic without a direct interaction with the network devices.

The present invention is mainly focused on zero-day cyber threat and malware detection, but has also the capability to detect known cyber treat and malware using its signature-based detection engine.

The invention allows, among other advantages:
Detecting infected or compromised hosts by known malware and cyber threat;
Detecting infected or compromised hosts by unknown or zero-day (0-day) malware and cyber threat;
Learning the normal behaviour of the network to allow detection of cyber threat and malware related activities;
Detecting infected or compromised devices as fast as possible;
Minimizing the impacts of compromises and cyber threat;
Minimizing the security risks and cyber threats by helping to fight malware and helping to secure computer networks; and
Alerting the user upon detection of abnormal activities over the network.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other objects, features and advantages of the invention will become more readily apparent from the following description, reference being made to the accompanying drawings in which.

DETAILED DESCRIPTION OF PREFERRED EMBODIMENTS

A novel data breach and malware detection system, herein below called CDS, and method thereof will be described hereinafter. Although the invention is described in terms of specific illustrative embodiment(s), it is to be understood that the embodiment(s) described herein are by way of example only and that the scope of the invention is not intended to be limited thereby.

Figure 1:
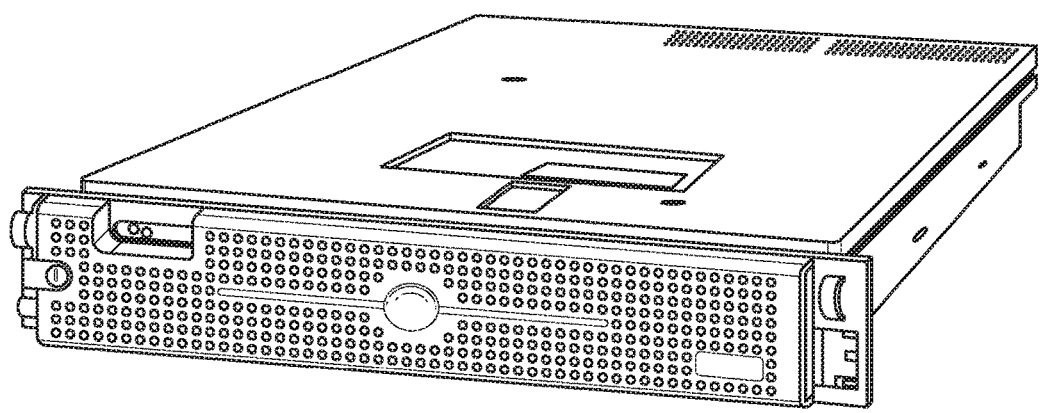
FIG. 1 is the physical appliance of the CDS in accordance of a preferred embodiment of the invention, comprising hardware and software.

FIG. 1 is an example of a physical appliance of the CDS in accordance of a preferred embodiment of the invention, comprising hardware and software. It is understood by persons skilled in the art, that the CDS can also be a virtual appliance, an ISO file (containing the operating system and the software) or any kind of software that users can install on their own hardware. The CDS can also be used as a Cloud-based application.

The system according to the present invention allows detecting cyber threat, data breach, infected or compromised devices on a computer network. The system is connected to at least one segment of the computer network. The system comprises:

at least one data collection module for capturing network packets entering and/or going out of the computer network;

at least one network interface module comprising at least one network interface card through which the at least one data collection module listens for said network packets entering and/or going out of the computer network;

at least one analysis module for receiving the network packets from the at least one data collection module, said analysis module detecting traffic associated to malware, data breach, and/or malware related activities over the computer network;

at least one learning module comprising at least one machine learning algorithm, defining rules and training tasks for determining at least one behaviour of the computer network, allowing detection of at least one deviation from said behaviour of the computer network;

at least one knowledge database for storing data about said behaviour of the computer network and at least one signature element of a known malware, each knowledge database providing stored data to each learning module and analysis module;

at least one scoring module for correlating data from the at least one learning module for reducing false positives in at least one behaviour detection phase; and at least one alerting module for creating at least one alert upon detection by the analysis module of malware, data breach, and malware related activities over the computer network.

According to a preferred embodiment, the system may further comprise at least one action module providing at least one blocking action wherein the action module is comprised of at least one system application, network device or network application such as a firewall, blocking communication from a remote device by way of example.

According to a preferred embodiment, the system comprises at least one storage database module storing data associated with any of the system's modules and providing said stored associated data to an at least one user interface module.

According to a more preferred embodiment, the at least one user interface module displays the said stored associated data from any of the system's modules and allows the user to manage the system.

According to a yet a more preferred embodiment, the interface module provides the interface features for configuring the network, updating any of the system's modules, sending email, sending attachments or sending the system's associated data over the computer network.

According to another preferred embodiment, at least one of said system module is embodied on a virtual machine.

According to another preferred embodiment, at least one segment of the computer network comprises at least one network WAN router, at least one core switch, at least one switch, at least one hub and/or at least one host connected to the computer network.

According to another preferred embodiment, the system is such that several of said data collection modules are connected to several segments of the computer network and to one central analysis module over the computer network.

According to another preferred embodiment, the least one storage database module's associated data is a device name, an IP address, a device priority, a device status, a device type and/or a device function.

According to yet another preferred embodiment, the at least one alerting module's associated data is an ordered list of the last alerts and/or status details about the said ordered list of alerts.

The method according to the present invention allows detecting cyber threat, data breach, infected or compromised devices on a computer network. The method comprises the steps of:
  a) collecting network packets entering and/or going out of the computer network from at least one segment of the computer network;
  b) analyzing said network packets for detecting cyber threat, malware, data breach and malware related activities and feeding said network packets to at least one alerting module and to at least one learning module;
  c) determining at least one behaviour of the computer network with at least one machine learning algorithm for allowing the detection of any deviation from said behaviour of the computer network;
  d) storing data associated with the behaviour of the computer network and at least one signature of known malware, and feeding said associated data to at least one analysis module and at least one learning module;
  e) correlating results obtained from steps b) and c) to reduce false positives in an at least one behaviour detection phase; and
  f) generating at least one alert upon detection of cyber threat malware, data breach, and/or malware related activities over the computer network.

According to a preferred embodiment, the method further comprises the step of storing at least one of the system's associated data.

According to another preferred embodiment, the method further comprises the step of displaying to the user any of the said system's stored associated data.

According to another preferred embodiment, the method is such that the stored associated data is in the form of raw data, generated reports, lists, statistics, actionable user interface elements and/or attachments.

According to another preferred embodiment, the method further comprises the step of displaying user interface features for configuring the network, updating any of the system's modules, sending email, sending attachments or sending the system's stored associated data over the computer network.

According to another preferred embodiment, the method is such that at least one segment of the computer network comprises at least one WAN router, at least one network core switch, at least one switch, at least one hub and/or at least one host connected to the computer network.

According to another preferred embodiment, the method is such that at least one stored associated data is a device name, an IP address, a device priority, a device status, a device type, a device and/or a device function.

According to another preferred embodiment, the method further comprises the step of ordering the generated alerts as a list of last alerts and associating the generated alerts with the status details of said ordered list of alerts.

According to another preferred embodiment, the method further comprises the step of prioritizing the generation of alerts according to a device type.

EXAMPLES

FIG. 1 illustrates an appliance of the CDS in accordance of a preferred embodiment of the invention that may comprise a box comprising hardware and software. Other configurations of the system can be considered without departing of the scope of the present invention.

Figure 2:
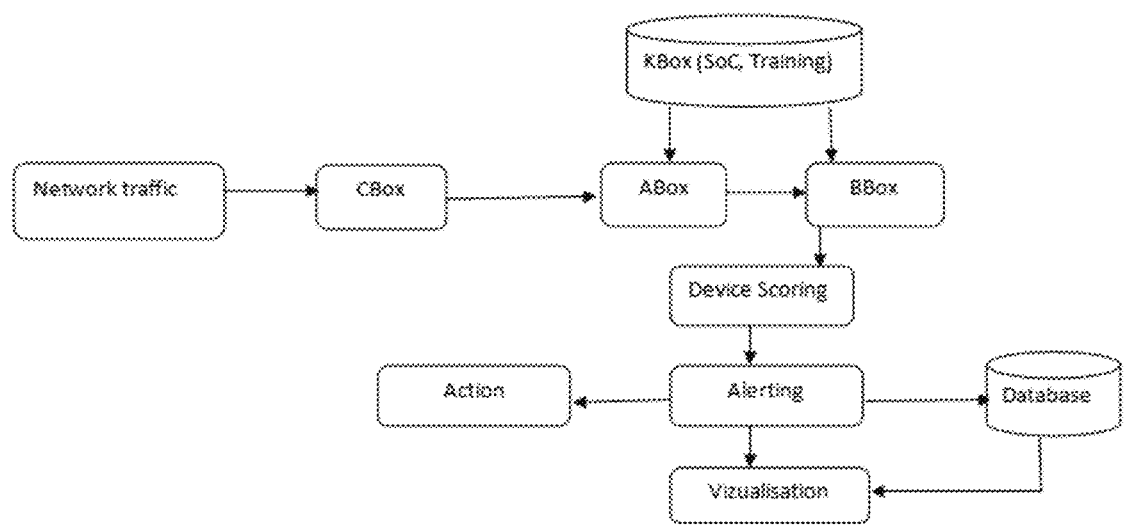
FIG. 2 is the Block Diagram of the CDS in accordance of a preferred embodiment of the invention.
Figure 2:
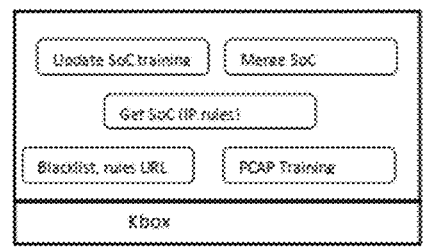

Referring to the diagram of FIG. 2, the network traffic is routed through a CBox that collects ingoing and/or outgoing data. The traffic is then analysed by a ABox that detects malicious activities. The traffic then passes through a BBox that detects the abnormal behaviour of the network.

Still referring to FIG. 2, the ABox also feeds an Alerting module that generates alerts upon detection of malicious activities by the ABox. All alerts are then stored in a Database to be consulted by a user through a Visualization module.

Still referring to FIG. 2, a KBox contains the signature database that feeds both the ABox and the BBox. The KBox contains the baseline of normal traffic and helps the ABox and the BBox to make more accurate decision regarding if anomalies in the traffic are benign or malicious.

Figure 3:
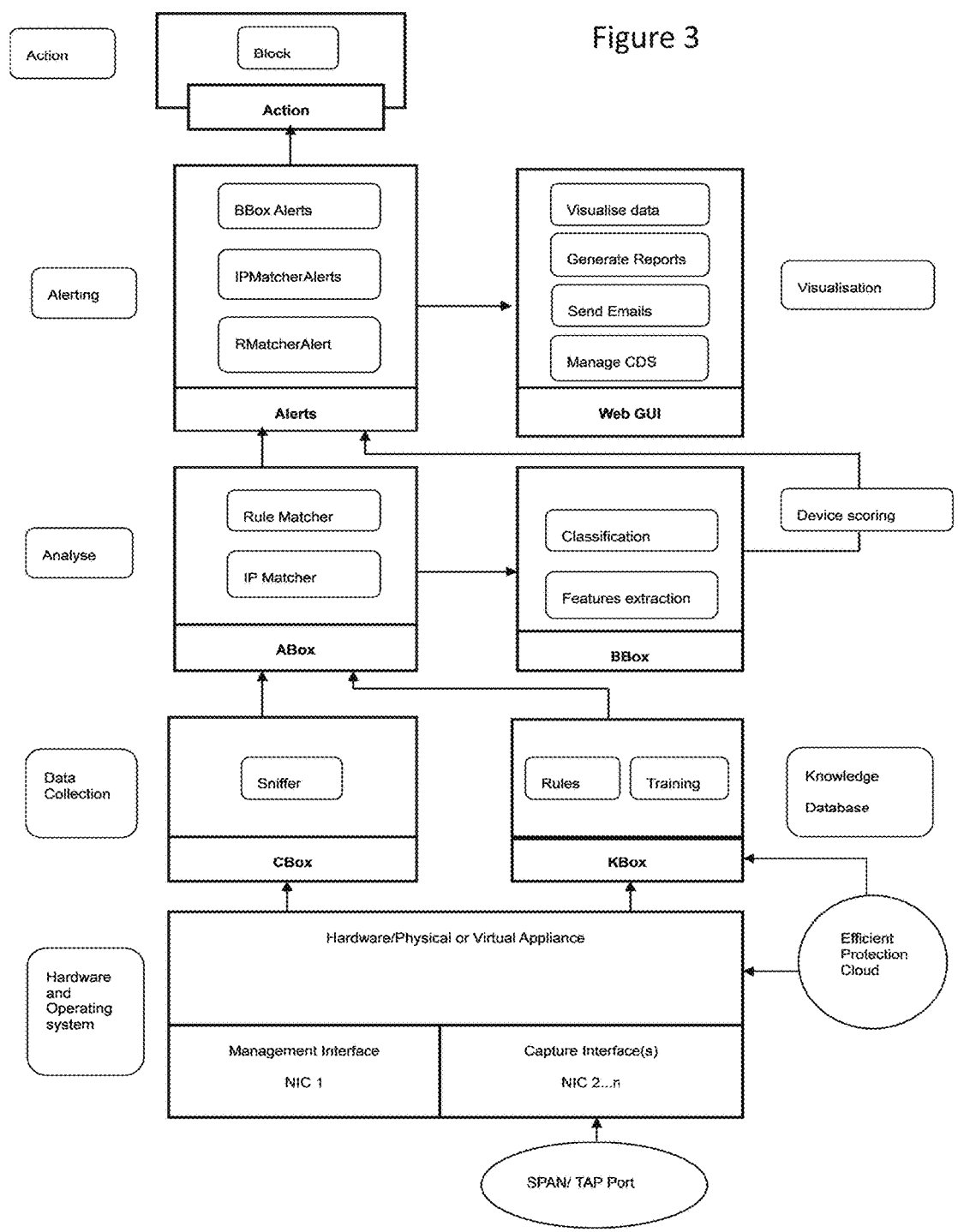
FIG. 3 is an overview of the internal architecture of the CDS in accordance of a preferred embodiment of the invention.

FIG. 3 illustrates a possible embodiment of the whole architecture of the CDS. In such architecture, the components are as follow:

Hardware and Operating System: The CDS could be a physical/hardware appliance or a virtual appliance. It could also be an ISO file (containing the operating system and the software) or any kind of software that users could install on their own hardware. The CDS could also be used as a Cloud-based application.

At least, one Network Interface Card (NIC) of the CDS is preferably used to capture the network traffic using a switch SPAN Port or a network TAP device. Another NIC could be preferably used for the management of the appliance (HTTPS, SSH, etc.). The appliance could have two or more NIC interfaces.

CBox: The CBox is the data collection module of the CDS. It captures the network packets entering and going out of the network. Its network interface (NIC) is preferably configured in a promiscuous mode and preferably connected to a SPAN port or a TAP device.

The core component of the CBox is a sniffer which listens to a network interface (NIC) of the CDS in a promiscuous mode allowing the sniffer to capture all the network packets. Traffic captured by the CBox will be preferably stored in PCAP files for a configurable period of time. The sniffer of the CBox has the capability to split big files and to reassemble fragmented network packets if needed. The CBox could also capture the traffic in a streaming mode for an inline analysis by the CDS (without storing the traffic in PCAP files).

A PCAP file is a file containing network packets and payloads. One PCAP file is created for each generated alert or event. This PCAP file contains all the packets related to the alert. Users can download it for deep analysis if needed using tools like Wiresharkor the likes.

KBox: The KBox is the database of signatures (Sign of Compromise) and the baseline of abnormal traffic. It feeds both the signature-based detection module (ABox) and the behaviour-based detection module (BBox) to make decision about whether the network traffic is benign or malicious.

The core components of the KBox are:
1. Rules: Contains the signatures of malware, IP addresses of known Command and Control centers of botnets (a.k.a C&C), IP of known infected devices on the internet, proprietary malware rules created in a sandbox, etc.
2. Training: This is the baseline of abnormal traffic and helps to identify abnormal flows that are related to cyber threat and malware.

The KBox could be periodically updated using new model files available in the cloud.

ABox: The ABox is the signature-based detection module that detects cyber threat, malware traffic and activities related to malware over the network. The ABox was designed preferably to detect known cyber threat and malware by analysing all kinds of internal and external traffics.

The core components of the ABox are:
1. The IP Matcher: Using the rules of the KBox, the IP Matcher of the ABox is able to do pattern-matching only in IPs to detect in-out communication related to cyber threat or malware such as communication with botnet's C&C or blacklisted malicious hosts, spamming hosts, and the likes.
2. The Rule Matcher: This part of the ABox is devoted to the detection of cyber threat or malware by analysing the header of network flows (IP source, IP destination, port source, port destination, protocol) or the payload of the packets to find pattern of malware.

BBox: The BBox comprises a collection of complex machine learning algorithms and methods used to detect anomalies on the network behaviour. It is thus possible to detect unknown cyber threat or malware and zero day malware since the BBox will detect any deviation from the normal behaviour of the network.

The core components of the BBox are:
1. Features extraction: This part helps to construct network flows using network packets. Then, the features needed to detect malware are extracted.
2. Classification: The goal of the classifier is to classify the network flows as normal or abnormal (cyber threat or malware related). In order to be able to classify the flows, the classifier will learn the normal behaviour of the network for a period of time, *usually 2 weeks or more*. After the training, it will be able to identify suspicious flows related to malware activities or cyber threat. For better efficiency, the training of the classifier is preferably carried once every 3 months or when there is a major change over the network such as new applications on production.

Device Scoring Module: This innovative method was created to correlate results from different boxes and to reduce false positive in the behaviour detection phase. This module takes into account contextual information to score each device in the network in order to have a better decision quality.

Visualization Module: The CDS has advanced visualisation functions in the web user interface. Using the web graphic user interface, users are able to display a global view of the cyber threat and malware activities on the network, configure a remedy, and generate reports and notifications. This module helps a security team starting an investigation and managing efficiently security incidents in a network.

Alerting Module: The alerting module is able to generate unified alerts and events for both the ABox and BBox in multiple formats such as json, csv and databases.

The CDS also allow sending the alerts to a Security Information and Event Management tools (STEM), using protocols like SYSLOG or the likes.

The core components are:
1. IPMatcherAlert: It generates an alert when the ABox detects that an IP on the network traffic that matches an IP included on the Rules part of the KBox.
2. RMatcherAlert: It generates an alert when the ABox detects that the header or the payload of a packet matches a rule included on the Rules part of the Kbox.
3. BBoxAlert: It generates an alert when the BBox detects an abnormal flow related to a cyber threat or malware using the Classification part of the KBox and the Device Scoring system.

Database: The database of the CDS stores data about the events, alerts, flows, devices, PCAP files, etc. A PCAP file is a file containing network packets and payloads. It could be created for each generated alert. A PCAP file preferably contains all the packets related to the alert. Users could download the PCAP file for deep analysis if needed using tools like Wireshark or the likes.

Action Module: the Action module allows taking a blocking action using the CDS internal capabilities or using a network security device like a firewall. E.g.: blocking a communication with a remote malicious device or blocking a data exfiltration.

Still referring to FIG. 3, in such embodiment, the network traffic coming from internet is received by the WAN router before entering the company's network. Then, the traffic preferably goes through the firewall, the proxy and the core switch before going to the other components of the network. The other components of the network could be servers, databases, laptops, and the likes. Connecting the CDS to the core switch allows it to see all the traffic entering or going out of the network.

Figure 4:
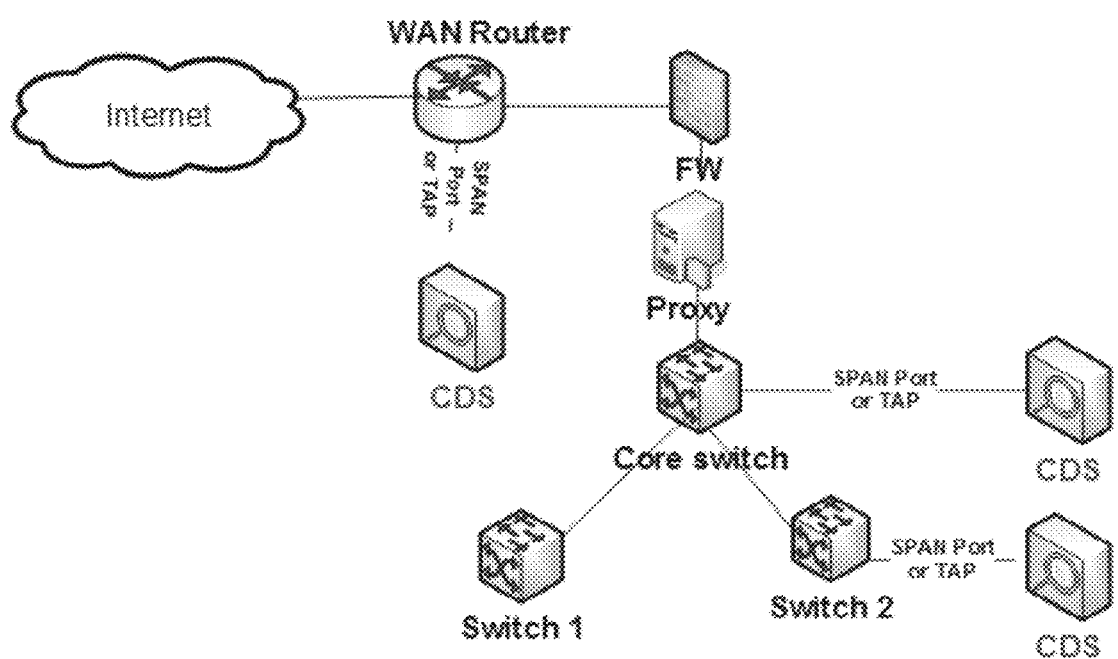
FIG. 4 displays the architecture of the standalone implementation of the CDS in accordance of a preferred embodiment of the invention.

Referring to FIG. 4 representing the use of the CDS in a standalone mode. The CDS could be connected to the WAN router, the Core Switch of a network to analyse all the in-out traffic or on any other switch of a network to analyse the traffic of a given segment of the network. In the standalone mode, all the components of the CDS are preferably integrated in the same host. The CDS acts as appliance "all in one" system.

Figure 5:
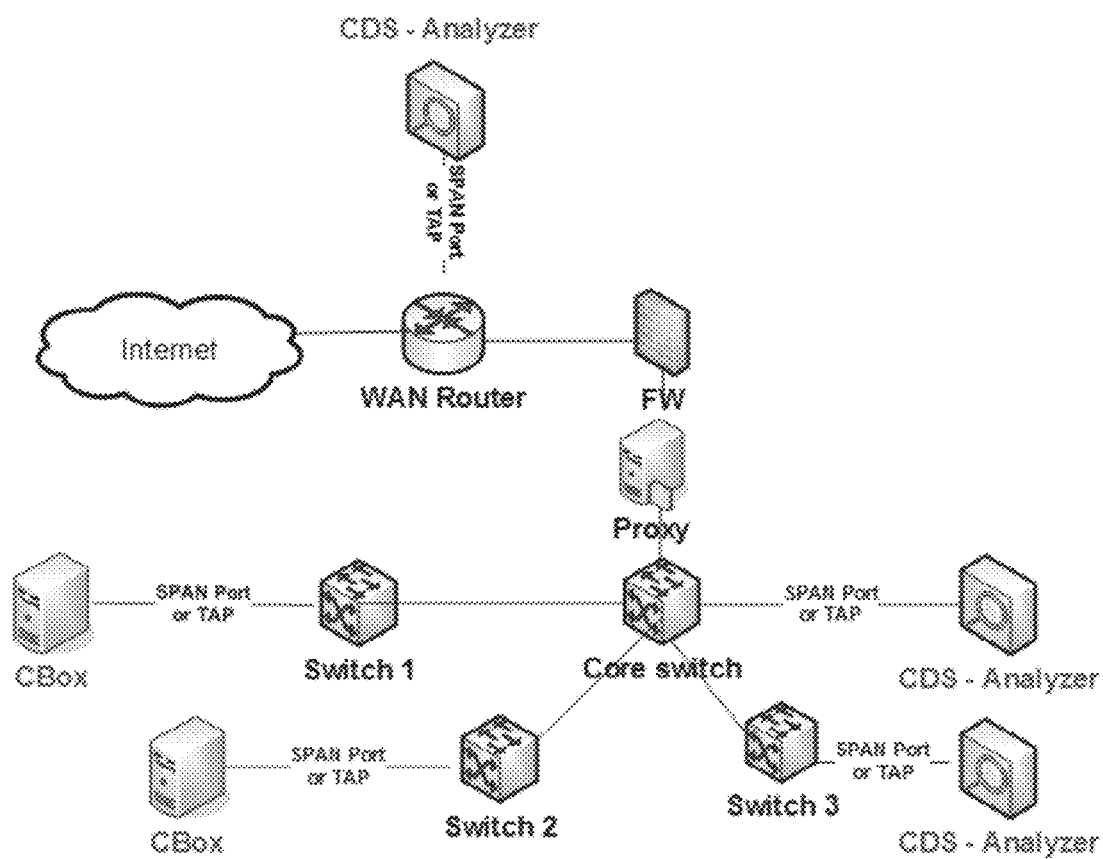
FIG. 5 displays the architecture of the distributed implementation of the CDS in accordance of a preferred embodiment of the invention.

Referring to FIG. 5, in another embodiment, the invention could be also used in a distributed mode. This architecture is suitable for large networks. In this mode, one or several collectors (CBoxes) could be installed on specific segments of a network to capture data. There is preferably one CBox by segment. A SPAN port of a switch or a network TAP could be preferably used to capture the data in each segment. The traffic captured by each CBox is then preferably sent to a central CDS for analysis. This CDS acts as a Global Analyser. If existing in the network, legacy network packets capture tools, such as Collectors, could be used. These legacy systems are preferably configured to send data to the centralized analysis part of the CDS.

If needed, CBoxes could be installed on some switches of the networks. The CDS could be installed on the WAN router, the Core Switch or in another segment of the network.

In the distributed mode, the data collection (CBox) preferably runs on a separated host and is called a Collector. Several Collectors could be used if needed and each of them collects data on a given segment of a network. Then, they forward the collected data to the centralized analysis part of the system, which is preferably a full CDS with CBox, KBox, ABox, BBox, Device Scoring, Alerting, Action, Visualization, and Database.

If existing in the network, legacy network packets capture tools, such as Collectors, can be used. These legacy systems are preferably configured to send data to the centralized analysis part of the CDS.

The central CDS could be installed on the WAN router, the Core Switch or in another segment of the network. All the CBoxes are preferably configured to send their captured data to the central CDS.

Figure 6:
FIG. 6 is a view of the web graphic user interface of the CDS in accordance of a preferred embodiment of the invention.

Referring to FIG. 6 representing the visualization interface. The core components of the visualization are the following.

Data visualization: This includes viewing data on the dashboard of the system. Possible data are, for instance, the number of compromised or suspicious devices, the TOP 10 of last alerts and events, details about each alert. Such details could include the device name, IP address, device priority, device status (compromised or suspicious). The priority of a device is related to its importance for a company. High priority devices could be: transactional web servers, domain controllers, databases storing credit card numbers of confidential information, and the likes. Low priority devices could be desktops or laptops used by employees for their normal working activities. When an incident occurs, knowing the priority of the devices helps the security administrators to focus on the ones that are the most important for the company.

Reports generation: The users could generate reports in format like PDF. They could also choose to send the reports by email. Examples of reports available in the CDS are: source of compromise, compromise by protocol, detected malware, devices under investigation, cleaned devices, and similar information of interest.

Sending emails: Alerts generated by the CDS could be send by email to security administrators, the incident response team, and upper management.

Managing the CDS: This is the advanced capabilities of the GUI for helping the security administrators configuring and managing the CDS, it allows:

Configuring the network (setting the IP, Mask and Gateway);
Updating the signatures database (KBox);
Training the system (behaviour module); and
Managing the users of the CDS (creation, update, deletion).

Still referring to FIG. 6, in the dashboard of the CDS, a security administrator is preferably able to see the number of devices that are compromised or that have a suspicious behaviour. The dashboard also preferably shows information like the last alerts generated by the system and the number of impacted devices by priority (Low, Medium, High).

The user could also choose to detect only the devices that are compromised or that have a suspicious behaviour in a specific segment of its network such as a segment having critical servers or databases. In this case, the CDS could not be preferably connected only to the core switch. The CDS is preferably connected to the switch of this specific segment of network.

The CDS is also preferably connected to a SPAN port of the switch, of the WAN router, the Core switch, or of a network segment switch, to allow the full capture of the traffic entering or going out of all the devices of the network or of the segment. Instead of the SPAN port, a Network TAP could also be used to capture the traffic.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A system comprising at least one processor and at least one non-transitory computer readable media configured to detect zero-day cyber threat, data breach, infected or compromised devices on a computer network, the system being connected to at least one segment of the computer network, the system comprising:
at least one data collection module configured to capture all network packets entering and/or going out of the computer network via the at least one network interface;
at least one analysis module for receiving the network packets from the at least one data collection module, the analysis module comprising instructions for detecting traffic associated to zero-day malware, data breach, and/or malware related activities over the computer network by using information contained in a network flow header of the network packets and information contained in a body section of the network packets to identify a pattern;
at least one learning module configured to execute at least one machine learning algorithm, the at least one learning module being configured to:
identify network flows based on the captured network packets;
execute predetermined rules and training tasks for a predetermined period of time to learn at least one normal behavior of the computer network;
detect-the network flows deviating from the learned normal behaviour of the computer network;
identify the suspicious network flows as abnormal;
at least one knowledge database configured to provide stored data to the at least one learning module and to the at least one analysis module, the at least one knowledge database storing:
training data and rules about the determined abnormal behaviours of the computer network; and
at least one signature element of a known malware;
at least one scoring module configured to correlate data from the at least one learning module and the at least one analysis module using contextual information and the at least one learning module and to identify false positives during the detection of deviating network flow; and
at least one alerting module for creating at least one alert upon either:
detection by the analysis module of a network packet matching one of the rules of the at least one knowledge database;
identification by the learning module of an abnormal network flow.

2. The system of claim 1, further comprising at least one action module providing at least one blocking action.

3. The system of claim 2, wherein the at least one action module is comprised of at least one system application, network application or network security device.

4. The system of claim 1, further comprising at least one storage database module storing data associated with any of the system's modules and providing said stored associated data to an at least one user interface module.

5. The system of claim 4, wherein the at least one user interface module displays the said stored associated data from any of the system's modules and allowing the user to manage the system.

6. The system of claim 4, wherein the interface module provides the interface features for configuring the network, updating any module of the system, sending email, sending attachments or sending the system's associated data over the computer network.

7. The system of claim 1, wherein the at least one segment of the computer network comprises at least one WAN router, at least one network core switch, at least one switch, at least one hub and/or at least one host connected to the computer network.

8. The system of claim 1, wherein several of said data collection modules are connected to several segments of the computer network and to one central analysis module over the computer network.

9. The system of claim 4, wherein the at least one storage database module's associated data is a device name, an IP address, a device priority, a device status, a device type and/or a device function.

10. The system of claim 1, wherein the at least one alerting module's associated data is an ordered list of the last alerts and/or status details about the said ordered list of alerts.

11. A computer-implemented method for detecting cyber threat, data breach, infected or compromised devices on a computer network, the method comprising the steps of:
   a) collecting network packets entering and/or going out of the computer network from at least one segment of the computer network;
   b) identify network flows based on the collected network packets;
   c) execute predetermined rules and training tasks for a predetermined period of time to learn at least one normal behaviour of the computer network based on the identified network flows;
   d) storing data associated with the learnt normal behaviour of the computer network and at least one signature of known malware;
   e) detect the network flows deviating from the learnt normal behaviour of the computer network;
   f) analyzing said network packets for detecting cyber threat, malware, data breach and malware related activities based on the at least one signature of known malware;
   g) identify at least one network flow deviating from the learned normal behaviour of the computer network as being abnormal;
   h) correlating results obtained from steps b) and c) to reduce false positives during detection phase;
   i) generating at least one alert upon detection of a network flow being identified as abnormal or of at least one network packet matching one of the predetermined rules.

12. The method of claim 11, further comprising the step of taking at least one blocking action.

13. The system of claim 11, further comprising the step of storing data associated with any of the modules of the system.

14. The method of claim 13, further comprising the step of displaying to the user any of the said system's associated stored data on at least one user interface module.

15. The method of claim 13, wherein the said stored associated data is in the form of raw data, generated reports, lists, statistics, actionable user interface elements and/or attachments.

16. The method of claim 14, further comprising the step of displaying user interface features for configuring the network, updating any of the system's modules, sending email, sending attachments or sending the system's stored associated data over the computer network.

17. The method of claim 11, wherein the at least one segment of the computer network comprises at least one WAN router, at least one network core switch, at least one switch, at least one hub and/or at least one host connected to the computer network.

18. The method of claim 13, wherein the at least one stored associated data is a device name, an IP address, a device priority, a device status, a device type, a device and/or a device function.

19. The method of claim 11, further comprising the step of ordering the generated alerts as a list of last alerts and associating the generated alerts with the status details of said ordered list of alerts.

20. The method of claim 11, further comprising the step of prioritizing the generation of alerts according to a device type.

* * * * *